United States Patent
Gefen et al.

(10) Patent No.: US 10,496,468 B2
(45) Date of Patent: Dec. 3, 2019

(54) ROOT CAUSE ANALYSIS FOR PROTECTION STORAGE DEVICES USING CAUSAL GRAPHS

(71) Applicant: EMC IP Holding Company LLC, Hopkinton, MA (US)

(72) Inventors: Avitan Gefen, Tel Aviv (IL); Amihai Savir, Sansana (IL); Ran Taig, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 160 days.

(21) Appl. No.: 15/876,187

(22) Filed: Jan. 21, 2018

(65) Prior Publication Data
US 2019/0227860 A1 Jul. 25, 2019

(51) Int. Cl.
*G06F 11/00* (2006.01)
*G06F 11/07* (2006.01)
*G06F 16/901* (2019.01)

(52) U.S. Cl.
CPC ........ *G06F 11/079* (2013.01); *G06F 11/0709* (2013.01); *G06F 11/0751* (2013.01); *G06F 11/0769* (2013.01); *G06F 16/9024* (2019.01)

(58) Field of Classification Search
CPC combination set(s) only.
See application file for complete search history.

(56) References Cited

U.S. PATENT DOCUMENTS

| | | | | |
|---|---|---|---|---|
| 2009/0183030 A1* | 7/2009 | Bethke | ............... | G06F 11/0709 714/37 |
| 2012/0116850 A1* | 5/2012 | Abe | ................... | G06Q 10/0639 705/7.38 |
| 2013/0191688 A1* | 7/2013 | Agarwal | ............ | H04L 41/0873 714/32 |
| 2017/0372212 A1* | 12/2017 | Zasadzinski | .......... | G06N 7/005 |
| 2018/0113783 A1* | 4/2018 | Luo | ..................... | G06F 11/3476 |
| 2018/0114234 A1* | 4/2018 | Fighel | ............... | G06Q 30/0201 |

* cited by examiner

*Primary Examiner* — Charles Ehne
(74) *Attorney, Agent, or Firm* — Staniford Tomita LLP

(57) ABSTRACT

Embodiments for finding a root cause of an anomaly in a network environment by representing assets in the network environment as respective nodes in a causal graph, wherein the nodes have a measurable quality that can be tracked and arcs between pairs of nodes represent causal relationships between nodes of the node pairs designating source nodes as processes at the top of a hierarchy of tracked processes, and sink nodes as processes at the bottom of the hierarchy and having characteristics of interest in the environment; detecting anomalies in the tracked processes embodied in the sink nodes; traversing the causal graph in a reverse order from a node in which an outlier is detected; and analyzing nodes along the traversal path to identify a node of the highest hierarchy that shows unusual behavior as the root cause.

19 Claims, 6 Drawing Sheets

ROOT CAUSE ANALYSIS FOR PROTECTION STORAGE DEVICES USING CAUSAL GRAPHS

TECHNICAL FIELD

Embodiments are generally directed to computer network monitoring, and more specifically to fault monitoring and analysis using causal graph analysis.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Complex systems such as information technology (IT) networks and environments are composed of numerous machines and processes that are connected in various different ways to source and sink data for each other. It is inevitable that unusual behavior, such as fault conditions, performance anomalies, outages, network breaches/attacks, and so on occur during the operational life of such large-scale networks. Network devices are thus monitored at different levels by various tools, some of which produce vast amounts of logs that are hard to digest and analyze. Understanding the cause of unusual behavior in such complex systems is often a very challenging and resource intensive process relying on trained system administrators and analysts. These analysts need to use their working experience and knowledge about the relationships between the different devices and network assets. Their tasks usually involve manually exploring logs or use other tools for different subsystems to try and locate the cause of any abnormality.

Graphical user interface (GUI) tools have been developed to help facilitate such manual analysis procedures. For example, GUI-based tools are currently used to help visualize and display single time-series information while also finding and presenting the anomalies of that time-series. However, these tools do not look at the system as a whole, nor do they fully utilize the relationships between the different system components. Moreover, some of the relationships are non-trivial and thus, cannot be captured by standard tools that look only for correlation rather than causality.

What is needed, therefore, is a way to improve fault monitoring and analysis by providing a prioritized list of possible causes to an observed anomaly. What is further needed is an analysis tool that allows analysts to explore and verify the real cause of abnormal network or device behavior in real time or near real time.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
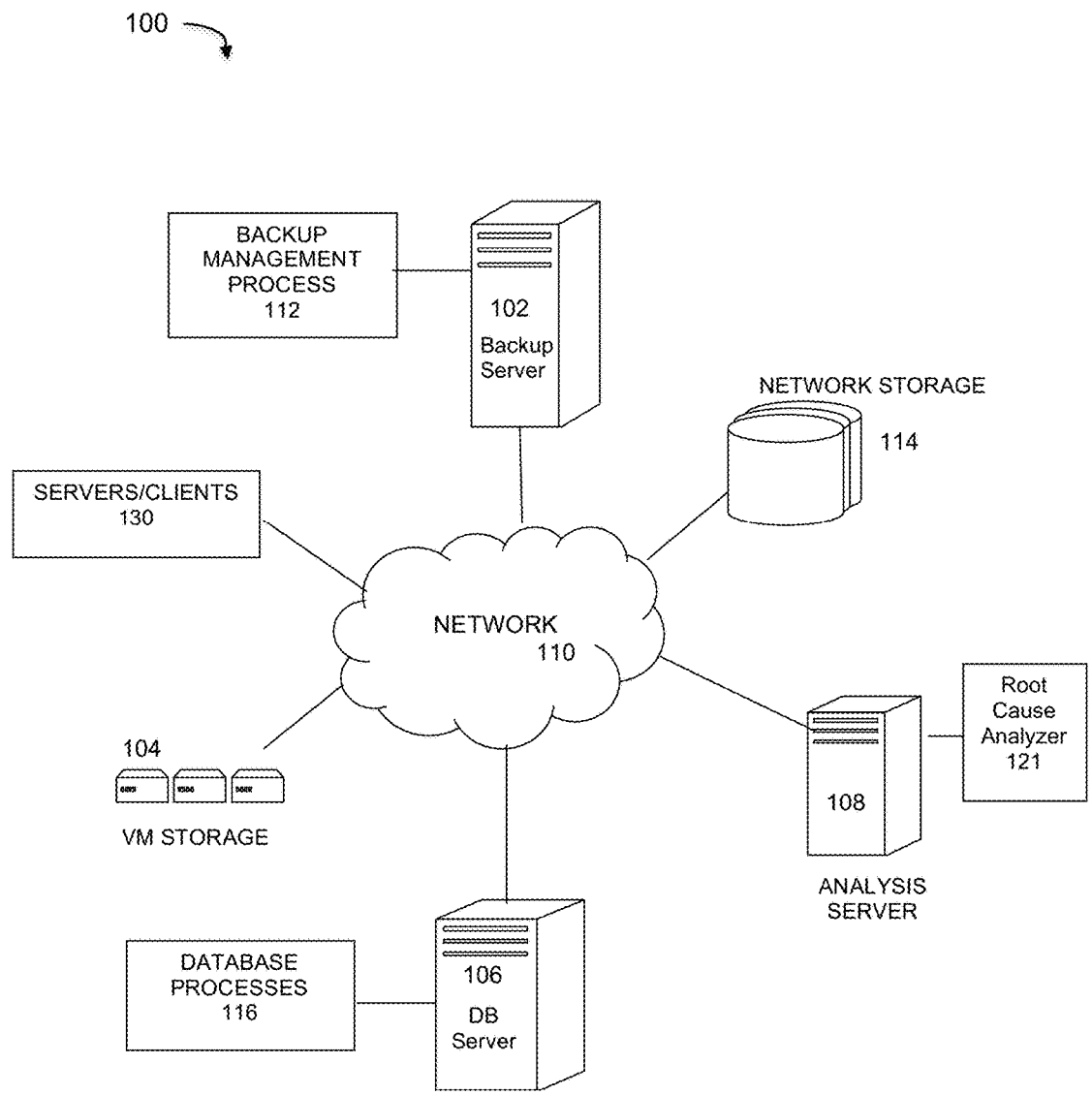
FIG. 1 illustrates a large-scale network system with devices that implement one or more embodiments of a root cause analysis process using causal graphs, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Some embodiments of the invention involve large-scale IT networks or distributed systems (also referred to as "environments"), such as a cloud based network system or very large-scale wide area network (WAN), or metropolitan area network (MAN). However, those skilled in the art will appreciate that embodiments are not so limited, and may include smaller-scale networks, such as LANs (local area networks). Thus, aspects of the one or more embodiments described herein may be implemented on one or more computers in any appropriate scale of network environment, and executing software instructions, and the computers may be networked in a client-server arrangement or similar distributed computer network.

As stated above, large-scale networks having large numbers of interconnected devices ("resources" or "assets") often exhibit unusual or abnormal behavior due to a variety of fault conditions or operating problems. Finding the root cause of such behavior is often a time and labor-intensive process requiring the use of specialized personnel and/or sophisticated analysis tools. FIG. 1 is a diagram of a network implementing a root cause analysis system and process to analyze abnormal network behavior, under some embodiments.

FIG. 1 illustrates an enterprise data protection system that implements data backup processes using storage protection devices, though embodiments are not so limited. For the example network environment 100 of FIG. 1, a backup server 102 executes a backup management process 112 that coordinates or manages the backup of data from one or more data sources, such as other servers/clients 130 to storage devices, such as network storage 114 and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, which may have attached local storage or utilize networked accessed storage devices 114.

The network server computers are coupled directly or indirectly to the target VMs, and to the data sources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client or server storage. The storage devices represent protection storage devices that serve to protect the system data through the backup process. Thus, backup process 112 causes or facilitates the backup of this data to the storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source (e.g., DB server 106) may be any appropriate data, such as database data that is part of a database management system 116, and the data may reside on one or more hard drives for the database(s) in a variety of formats.

As stated above, the data generated or sourced by system 100 and transmitted over network 110 may be stored in any number of persistent storage locations and devices, such as local client storage, server storage, or other network storage. In a particular example embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

Although embodiments are described and illustrated with respect to certain example implementations, platforms, and applications, it should be noted that embodiments are not so limited, and any appropriate network supporting or executing any application may utilize aspects of the root cause analysis process described herein. Furthermore, network environment 100 may be of any practical scale depending on the number of devices, components, interfaces, etc. as represented by the server/clients 130 and other elements of the network.

FIG. 1 generally represents an example of a large-scale IT operation environment that contains a large number of assets required by the business for daily operations. These assets are monitored by different response requirements, from every second to once a month or quarter, or more. Understanding unusual behavior of assets in the environment is crucial for the operation of the business, but it is not a trivial task, especially when there are numerous assets which are feeding each other or are connected in various ways. As stated above, present tools for analysts include observational monitoring tools and/or dedicated outliers/anomalies detection software to find outliers in the system behavior, which require personnel to manually try to locate the cause for the potential hazard. Embodiments include an automated tools or functional components/processes that analyze unusual conditions and find the root cause of such conditions using a causal graph of the system.

In an embodiment, network system 100 includes an analysis server 108 that executes a root cause analyzer process 121. This process implements an automated procedure that finds the root cause of anomalies, unusual behavior or problems exhibited by any of the components in system 100. It uses the generation of a graphical representation (causal graph) of the system acquired using domain experts or by using a semi-supervised tool. In an embodiment, the analyzer process 121 finds possible causes using a causal graph, and generates a prioritized list of possible causes to an observed anomaly. The result allows analysts to explore and verify the real cause of an anomaly in real or near real time.

In the context of a causal graph, causality is the relationship between a cause process and an effect process. Practical tools using causality prove that the values of a first variable directly influence or cause the values of a second variable. The causality may be proven through the use of tests or similar methods. Causality is considered a much stronger relation than correlation as the latter may be the result of coincidence or a third variable that influences both the first and second variables.

In general, causal graphs are graphical models used to encode causal assumptions about data-generating process. They are used in several fields such as computer science, epidemiology and social sciences. Each variable in the model has a corresponding node and an arrow (arc in graphical terminology) is drawn from variable v1 to variable v2 if v2 is presumed to respond to changes that occur in v1 when all other variables are being held constant. Causal graphs are also Directed Acyclic Graphs (DAGs), which is a graph with no cycles. In a DAG, nodes with only outgoing arcs are called "sources" while nodes with only ingoing arcs are called "sinks." Domain experts can use causal graphs to model causal interactions of components in a complex system such as an IT environment. The nodes in the graph represent components of the system that are related to each other through causal relationship (represented by arcs) and have a measurable quality that is being tracked, like the size of available storage, storage capacity, and so on. Any DAG has at least one source and one sink node. Source nodes represent processes that are at the top hierarchy of tracked processes in the environment, while sink nodes are at the bottom of the hierarchy. Sink nodes represent behavioral qualities of high interest in complex systems such as storage capacity. These components could be important on their own, or they could be positioned at end of a pipeline and therefore represent the health of a complex set of processes.

Figure 2:
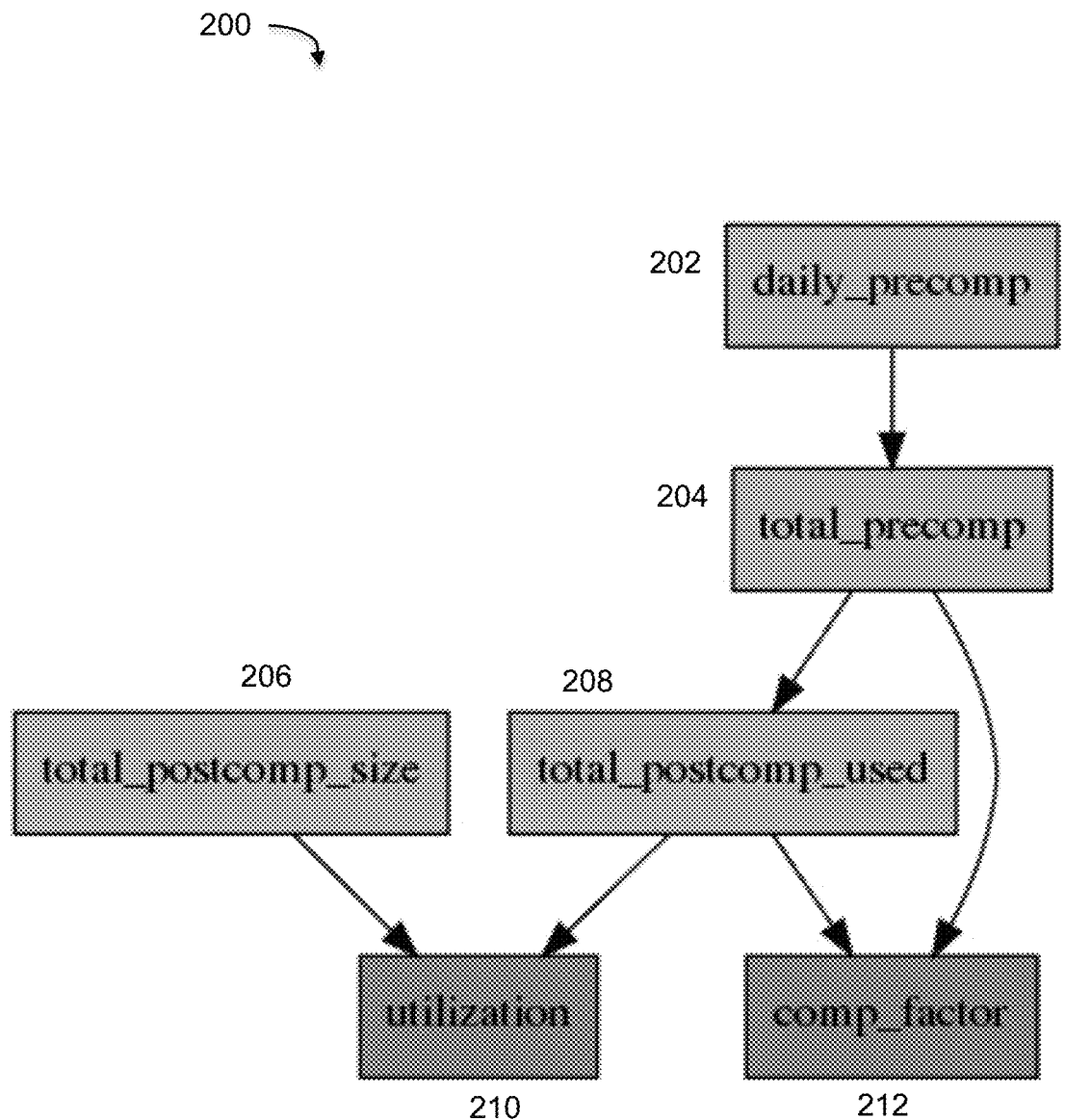
FIG. 2 illustrates an example causal graph for the data protection network of FIG. 1, under some embodiments.

FIG. 2 illustrates an example causal graph for the data protection network of FIG. 1, under some embodiments. The example graph 200 of FIG. 2 illustrates example metrics used in a Data Domain (or other backup system) comprising components of the graph. In the example causal graph 200, nodes 202 and 206 are source nodes, and nodes 210 and 212 are sink nodes.

The example nodes may be defined as follows:

Daily_precomp node 202 is the size of "logical" data that was backed up each day;

Total_precomp node 204 is the total size of real "logical" data that is backed up;

Total_postcomp_used node 208 is the used capacity, i.e., the total data size after compression;

Total_postcomp_size node 206 is the total capacity available;

Comp_factor node 212 equals (total_precomp)/(total_postcomp_used); and

Utilization node 210 equals (total_postcomp_used)/(total_postcomp_size)

As can be seen in FIG. 2, causal graph 200 contains 6 nodes and six edges. The edges (indicated by arrows→) and causal relations for causal graph 200 may be expressed as follows:

1. Daily_precomp→total_precomp is the daily data that is backed up each day affect the total size of data backed up.

2. Total_precomp→total_postcomp_used is the compressed version of total_precomp and therefore affected by it.

3. Total_postcomp_size→utilization is the relationship that comes from the definition of utilization.

4. Total_postcomp_used→utilization is relationship that comes from the definition of utilization.

5. Total_postcomp_used→comp_factor is the relationship that comes from the definition of comp_factor.

6. Total_precomp⊖comp_factor is the relationship that comes from the definition of comp_factor.

Figure 3:
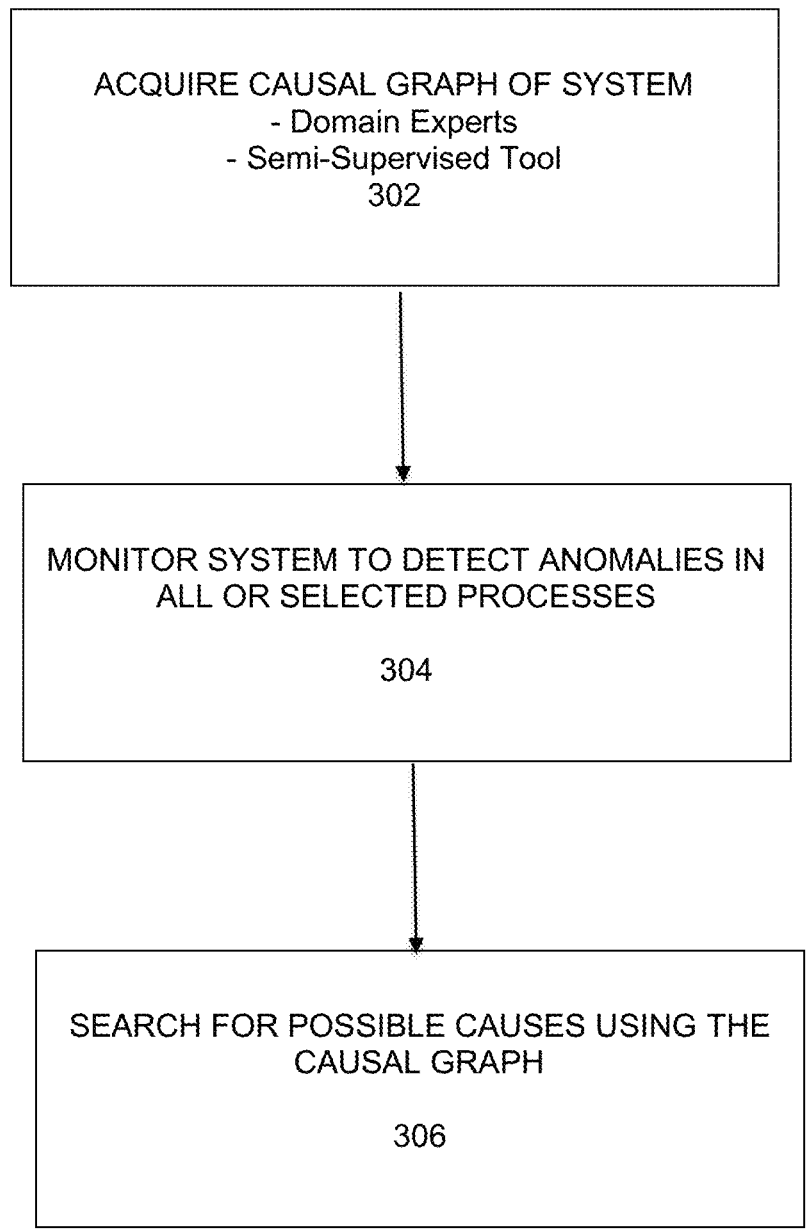
FIG. 3 is a flowchart that illustrates an overall method of finding the root cause of anomalies in a system using a causal graph, under some embodiments.

FIG. 3 is a flowchart that illustrates an overall method of finding the root cause of anomalies in a system using a causal graph, under some embodiments. Process 300 represents a novel approach for automating root cause analysis for complex systems, such as the IT environment of FIG. 1 or other similar systems. A first step 302 involves acquiring or generating a graphical representation (causal graph) of the system. The causal graph can be acquired using domain experts or by using a semi-supervised tool, as described in greater detail below.

Once the causal graph is acquired, the process 300 monitors the system to monitor the devices and links (assets) for unusual behavior. This step 304 detects anomalies in all or any (one or a few) selected processes, such as processes represented by sink nodes. The process then searches for the cause of an anomaly by utilizing the causal graph structure, step 306. In an embodiment, the cause determination is performed by traveling the graph in reverse order from the node in which an outlier was detected and analyzing components along the path. The root cause corresponds to the "highest" node in the hierarchy to show unusual behavior.

Acquiring a Causal Graph

FIG. 2 illustrates a causal graph that models a data storage system, such as system 100, for an example embodiment. The nodes in the graph represent components of the system that are related to each other through causal relationship represented by arcs. The structure and components of the causal graph are the input for the algorithm that searches for root cause, therefore the components selected to be part of the graph represent measurable and trackable processes, for which a time series is generated that tracks the changes of the process across time in an appropriate scale. For example, log data, which are events in time can be transformed into time-series data using aggregations. A causal graph, such as graph 200 can be acquired using domain experts or by using a semi-supervised tool.

In an embodiment, the semi-supervised tool comprises an automated agent is used to map complex network systems, such as IT environment 100. In this process, each of the components in the environment is defined as a variable in a causal network. A set of causality tests is run over all pairs of variables in the environment in an exhaustive manner. The output of this process is the causal graph, which is essentially a graphical model that captures the causal relationships between the environment components. For a graph such as graph 200, each vertex of the graph will represent a component, and an edge between a vertex X and a vertex Y is added in case we variable X is found to have causal effect on variable Y.

In an embodiment, the semi-supervised tool provides actual environment mapping by the identifying the relations between the system components. An all-pairs testing approach offers full automation of this process and results in a clear high-level mapping of the environment with some very helpful features. First, a corresponding user interface shows highly-connected areas with confident relations as one level of contrast (e.g., displayed as darker and sparser), and less confident areas as lighter, allowing the user to quickly focus the investigation into a specific area. Second, non-trivial relations (edges) can give meaningful insights that cannot be revealed manually or by other methods.

The semi-supervised tool creates a statistically driven mapping of the environment focusing in the causal relations between the different components of the environment. In at a high-level, the method is composed of the following main stages: (1) denote all the system components detailing the type of data they each output; (2) run a set of statistical tests over all pairs of components to determine the type and strength of the relation between each pair, if any; and (3) provide a graphical display of the causal graph through a user interface. Other steps may include validating the causal graph, based on the system administrator, and maintaining the graph to allow easy addition/subtraction of a component as well as simulating the effect of possible changes on the system.

With regard to denoting the system components, the process lists the different systems and processes composing the network and includes accurate details on the nature of data that represents each component. These details include the data resource and data type. The data resource specifies the function of the component, such as protection device (e.g., storage, server, client, etc.), internal data base (e.g., data domain), data protection appliance (DPA), business data lake, and so on. The data type specifies characteristics associated with the data used by the component, such as static/dynamic, time-series, numerical/categorical, and so on. This process can be done by a system administrator, but can also be automated by linking to existing tools that monitor the system or specific components therein.

In an embodiment, a discrete scale is used to denote the 'relation level' between each component. The scale [1-4] can be ranked from "no apparent relation" through "weak" and "strong" correlation up to "potentially causal." The administrator can configure the level of relation from which an edge will be added to the causal graph, as a dependency of the needs. Correlation tests are used to determine the relationship, and the exact test to be taken can be elected out of a set of common tests based on configuration. Alternatively, it can be selected automatically based on the data type of the two variables involved, e.g., time series, static, dynamic, etc. Although a scale of four values 1-4 for the relation level is shown, it should be noted that any appropriate scale and denotation can be used, such as 1-10, A-F, and so on.

In an embodiment, causality is determined using a Granger causality test, though other similar methods may also be used. This test utilizes the fact that most components output time series data or can be easily cast to this form, such as through the aggregation of log data, for example. The Granger causality test is a statistical hypothesis test for determining whether one time series is useful in forecasting another. A time series X is said to Granger-cause Y if it can be shown, usually through a series of t-tests and F-tests on lagged values of X (and with lagged values of Y also included), that those X values provide statistically significant information about future values of Y.

Although this process may be computationally expensive, it is an online process that is triggered once the tool is installed, and may be returned periodically in the case of radical changes to the system. Each of the suggested tests is linear in the size of the variables tested and the process thus is quadratic in the size of the data in the environment. In addition, as the process is based on pairwise components, independent tests can be easily parallelized, making it practicable and fast, even for very large-scale environments.

In an embodiment, a GUI based dash-board to visualize the results of the tests. The results of the tests are visualized on a dash-board as follows. Each component in the system will be viewed as a node that the user can select to get further information. For example, component configuration details and a link to the data resource of the component. The (directed) edges connecting the nodes represent the results of the tests. No edge will be drawn between nodes with relation level 1. An edge will be drawn between nodes A and B in case A was found to be with relation level 2-4 to B. The color of the edge on the dashboard will correspond to the relation level found in a contrasting manner, e.g., darker in color as stronger is the relation. This will allow the user to easily locate the factors which are most probable to cause an anomaly while investigating it. The user will be able to select an edge to get the results of the tests for which the relation level has been determined. The dashboard will also enable an easy zoom-in\zoom out capability to further ease the anomaly investigation process wherein the user can first get an overview of the system and then focus on the relevant area.

In an embodiment, the process also provides for validating the causal graph based on the system administrator. Although the relations levels are based on strong statistical tests, it is well known that correlation (as opposed to causality) does not necessarily suggest a significant relation between the two components in question. To minimize this effect, the system will allow a domain expert to review the results and change the relation level determined based on prior knowledge.

In an embodiment, the tool is configured to allow the user first to pre-configure thresholds in advance for the correlation results that will classify a relation to a specific level of the scale (e.g., 0.5-0.7 will suggest level 2 and >0.7 will suggest level 1 out of 4). Second, the system will sort the relations to be examined so that the most "suspected ones" will go first. This can be just by the weakness of relation, but potentially it can be supported by smart automated decisions based on the graph structure (e.g., a link appears between two components in which all other paths between them are very long), it can also be supported by prior knowledge originated in the "wisdom of the crowd" e.g., links validated by users which manage closely similar environments.

In an embodiment, the tool provides mechanisms for maintaining the graph to allow for easy addition or subtraction of a component as well as simulating possible effects of changes on the environment. Since the causal graph is based on a process which is run one time upon initialization, the system will automatically trigger an update process based on certain time intervals between updates. The mutual independence of the relation tests enables an easy update of the system once a new component is added or removed.

Detecting Anomalies and Finding the Root Cause

Anomaly detection for time series typically involves finding outlier data points relative to a standard (usual or normal) signal. There can be several types of anomalies and the primary types include additive outliers (spikes), temporal changes, and seasonal or level shifts. Anomaly detection processes typically work in one of two ways. First, they label each time point as an anomaly or non-anomaly; second, they forecast a signal for some point and test if the point value from the forecast by a margin defining it as an anomaly. In an embodiment, any anomaly detection method may be used including STL (seasonal-trend decomposition), classification and regression trees, ARIMA modeling, exponential smoothing, neural networks, and other similar methods.

As shown in FIG. 3, once the causal graph is acquired or generated, process 300 utilizes it to detect anomalies in any or all selected or tracked processes, step 304. The causal graph encompasses time-series data for each of the components, such as temporal log data from transactions for each component. Embodiments use one of several known ways to find anomalies in a time series. For example, one method uses smoothers of the time-series, while others use forecasting methods. For detecting an outlier on the edge of a time series (the newest point), forecasting methods are generally more suitable. In an embodiment, the process conducts a competition between different forecasting models and chooses the one that performs the best on a test data set, i.e., the one that has the minimal error. The best model is used for forecasting and the difference between the actual value and the predicted one is calculated and evaluated. If the residual is significantly larger when comparing to the residual population, it is declared as an anomaly. The residual population essentially defines a threshold value against which an actual residual can be compared to allow the process to declare the outlier to be an anomaly. This method will thus detect unexpected changes in trend or seasonality, where seasonality refers to the periodic fluctuations that may be displayed by time series, such as backup operations increasing at midnight. The process can also be configured to assign weights for the anomalies based on the significance of the residual for a weighted calculation.

Figure 4:
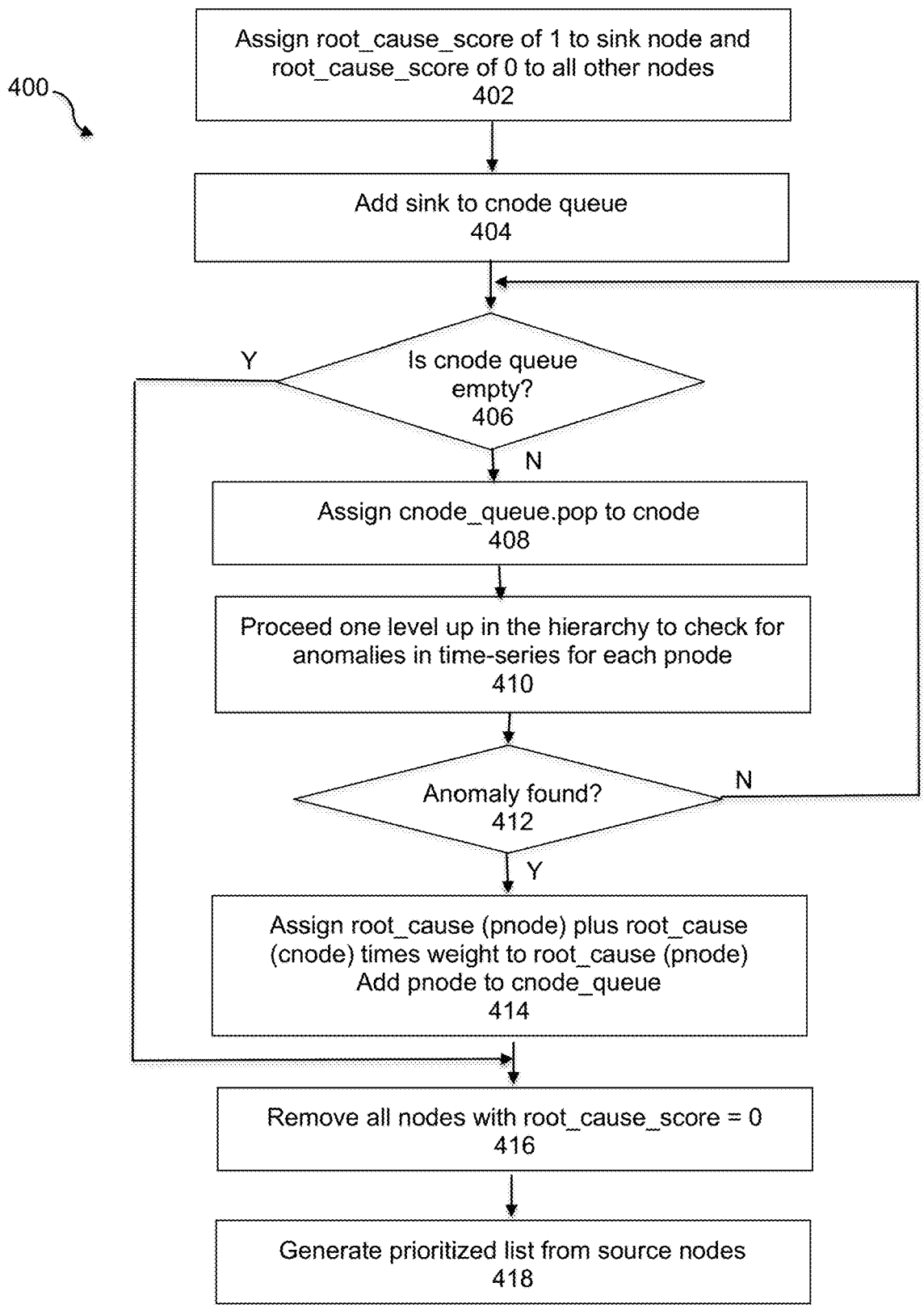
FIG. 4 illustrates a method of generating a prioritized list of causes from source nodes of a causal graph, under some embodiments.

With regard to step 306 of process 300, in which the possible causes are searched, the chosen tracked process will usually be a sink in the causal graph representing an end process of some pipeline. When detecting an anomaly in a sink, the process executes a procedure, such as shown in the flowchart of FIG. 4. Process 400 of FIG. 4 illustrates a method of generating a prioritized list of causes from source nodes of a causal graph, under some embodiments. Process 400 travels the causal graph starting at the sink node and first assigns a value of one to the score (root_cause_score) of the sink node, and a value of zero to the other nodes, step 402. Thus, as shown programmatically:
  root_cause_score (sink)←1
  root_cause_score (for all nodes except sink)←0

The sink then added to a queue denoted the cnode_queue, step 404. In step 406 it is determined whether or not the cnode queue is empty. If it is empty, the process proceeds from step 412; otherwise, the process assigns a cnode_queue.pop to the cnode, step 408, as in:
  cnode←cnode_queue.pop (FIFO style)

After this, the process checks two conditions and performs the following loop:
  a. cnode←cnode_queue.pop (FIFO style)
  b. If cnode was already visited go to a, else:
  c. If not all childs of cnode were visited, push cnode back in queue and go to 2.1, else:
  d. Mark cnode as visited These conditions will make sure that the process only propagate the information of cnode once after it reached the maximum score. The full context of the conditional loop is provided in the expanded example pseudocode below.

The process then goes up one level in the hierarchy, and for each node (referred here as pnode) that has outgoing arcs to the cnode, check for the existence of anomalies in the time-series that represent their behavior, step 410. It is then determined in step 412 whether or not an anomaly was found in a given period of time (e.g., 3 days) from the anomaly in question. If so, the process makes the following assignments (step 414) and adds the pnode to the cnode_queue:
  root_cause (pnode)←root_cause (pnode)+
  root_cause (cnode)*anomaly_weight The process then loops back to decision block 406 or to step 416 wherein it removes from the casual graph all nodes with root_cause_score equal to zero. The source nodes (nodes with no ingoing edges) in the new causal graph are the potential root causes. In step 418, the process generates a prioritized list from the source nodes using their scores. Such a list can be formatted in any appropriate way and typically lists most relevant (highest scoring) nodes higher in the list.

An example segment of pseudocode for the process of FIG. 4 is provided below. It should be noted that this program code is provided for purpose of example only and embodiments are not so limited.

1. root_cause_score (sink)←1 root_cause_score (for all nodes except sink)←0
   Add sink to cnode_queue
2. If cnode_queue is empty go to 5, else:
   2.1 cnode←cnode_queue.pop (FIFO style)
   2.2 If cnode was already visited go to 2.1, else:
     2.3 If not all childs of cnode were visited, push cnode back in queue and go to 2.1, else:
     2.4 _Mark cnode as visited
3. Go up one level in the hierarchy—For each node (referred here as pnode) that has outgoing arcs to cnode, check for the existence of anomalies in the time-series that represent their behavior. If an anomaly was found in a given timeframe (i.e. 3 days) from the anomaly in question:
   3.1 root_cause (pnode)←root_cause (pnode)+root_cause(cnode)*anomaly_weight
   Add pnode to cnode_queue
4. Goto 2
5. Remove from the casual graph all nodes with root_cause_score equal to zero.
6. The source nodes (nodes with no ingoing edges) in the new causal graph are the potential root causes.
7. Generate a prioritized list from the source nodes using their scores.

In an embodiment, the root cause analyzer searches for the cause of a detected anomaly by traversing the causal graph in reverse order from the node in which an outlier was detected and analyzes components along the path. The root cause is the "highest" node in the hierarchy that shows unusual behavior. In an embodiment, the graph traversal process comprises a breadth-first search (BFS), which searches a graph structure starting at the tree root and explores neighbor nodes first before moving to next level neighbors. Other traversal processes can also be used, such as depth-first search (DFS), but any traversal process should implement conditions to be kept, such as performing one visit after visiting all childs.

Embodiments of the root cause analyzer process 121 include a GUI interface that contains a dashboard for presenting the user with the anomalies in the chosen time series. For each anomaly, it will also provide a prioritized set of potential causes for that anomaly.

Figure 5:
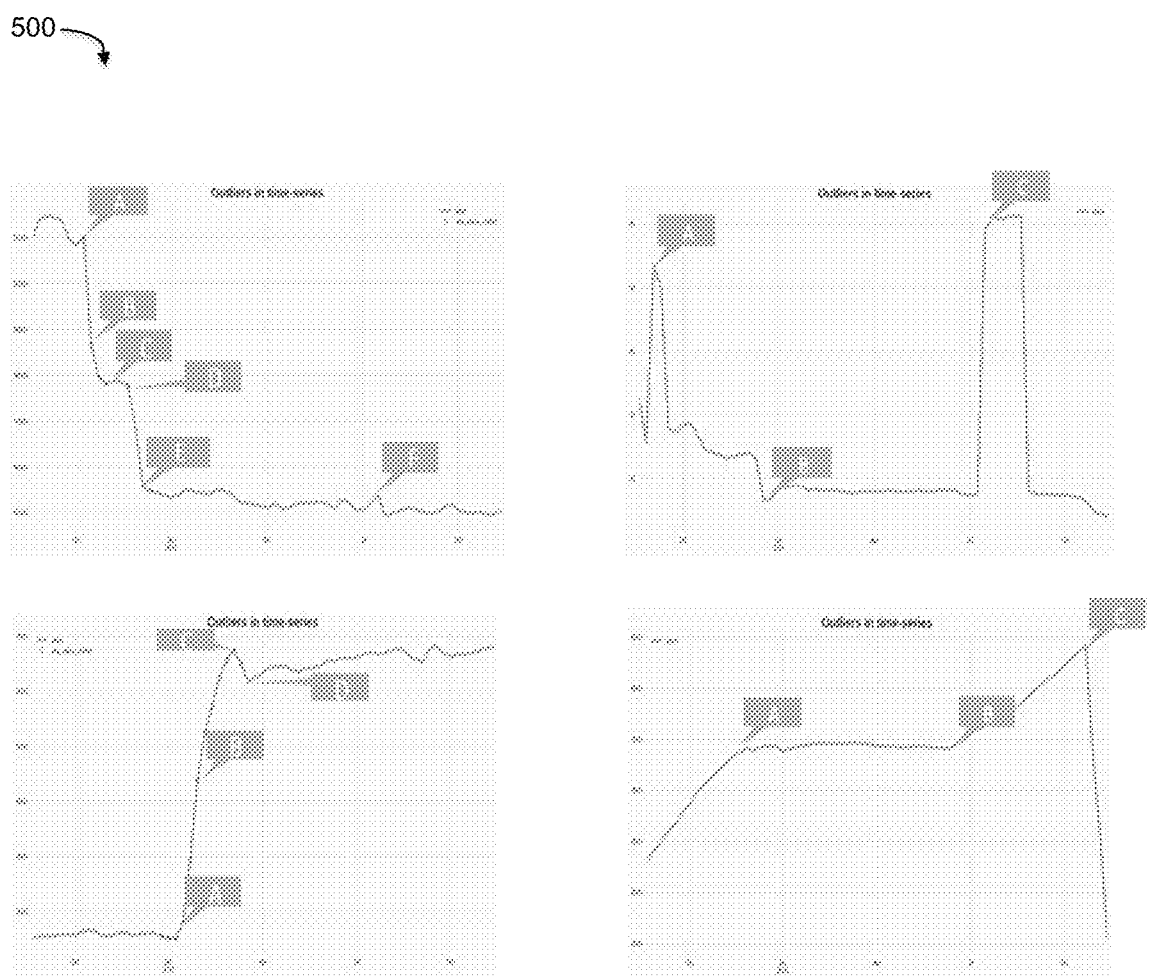
FIG. 5 illustrates certain graphs showing experimental results illustrating example anomalies that could be explored using a root cause analyzer process under some embodiments.

FIG. 5 illustrates certain graphs showing experimental results illustrating example anomalies that could be explored using a root cause analyzer process under some embodiments. Each graph illustrates a number of outliers (y-axis) plotted against time (x-axis) on a monthly scale. In each graph of FIG. 5, anomalous incidents are shown as denoted by a letter, e.g., A, B, C, D, etc. The GUI can be configured such that a selecting each of these anomalies will show a prioritized list of potential causes. The graphs of FIG. 5 are provided for example only, and any configuration of causal graph may be generated depending on system configuration, applications, and so on.

Embodiments described herein provide the use of causal graphs for automated root cause analysis of anomalies in large-scale networks and environments. Through the use of a root cause analyzer process, system administrators can get alerts of anomalies in system behavior. The process provides a prioritized list of potential causes of anomalies, which can be used to optimize the process of finding malfunctions in the environment and resolving them quickly. This provides significant advantages over previous solutions that do not use causal graphs for automated root cause analysis in the domain of data protection and other similar environments.

System Implementation

Figure 6:
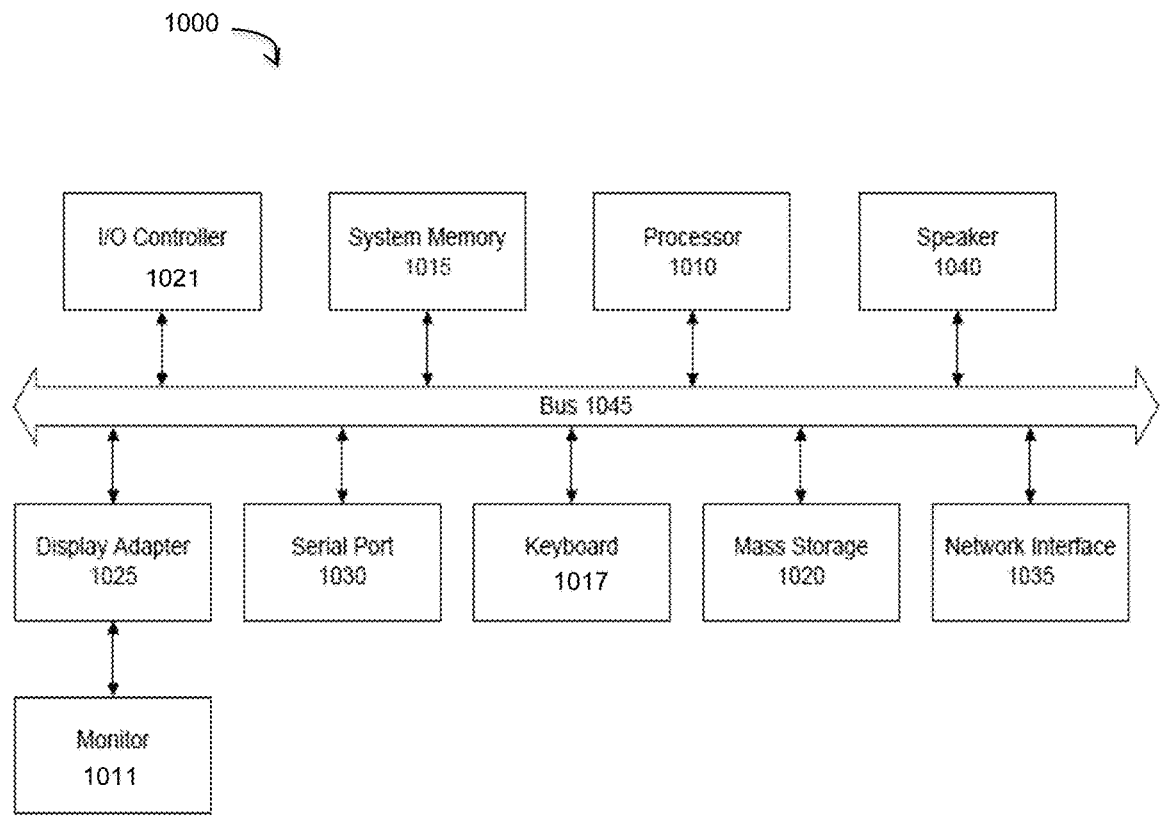
FIG. 6 is a block diagram of a computer system used to execute one or more software components of a root cause analyzer, under some embodiments.

As described above, in an embodiment, system 100 includes a root cause analyzer 121 that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein. FIG. 6 is a block diagram of a computer system used to execute one or more software components of a root cause analyzer, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 6 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

Embodiments may be applied to data, storage, industrial networks, and the like, in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of finding a root cause of an anomaly in a network environment, comprising:
    representing assets in the network environment as respective nodes in a causal graph, wherein the nodes have a measurable quality that can be tracked and arcs between pairs of nodes represent causal relationships between nodes of the node pairs;
    designating source nodes as processes at the top of a hierarchy of tracked processes, and sink nodes as processes at the bottom of the hierarchy and having characteristics of interest in the environment;
    detecting anomalies in the tracked processes embodied in the sink nodes;
    traversing the causal graph in a reverse order from a node in which an outlier is detected; and
    analyzing nodes along the traversal path to identify a node of the highest hierarchy that shows unusual behavior as the root cause in a prioritized list of possible root causes.

2. The method of claim 1 further comprising defining a time series to track changes of the tracked processes across time in a defined time scale.

3. The method of claim 2 further comprising displaying all anomalies detected in the environment through a graphical user interface against the time series scale.

4. The method of claim 3 wherein the time series comprises log data generated for data transactions of the nodes.

5. The method of claim 4 further comprising transforming the log data into time-series data using aggregations.

6. The method of claim 2 wherein the detecting step comprises finding anomalies in the time series using one of a smoother process or a forecasting process.

7. The method of claim 6 wherein the outlier comprises a detection on an edge of the time series.

8. The method of claim 7 wherein the detecting step comprises a forecasting process utilizing different forecasting models.

9. The method of claim 8 further comprising:
    comparing results between forecasting models of the different forecasting models based on a test data set;
    selecting a model with a minimal error as a best forecasting model;
    using the best forecasting model to determine a difference between a predicted outlier value and an actual outlier value to determine a residual value; and
    declaring the outlier to be an anomaly if the residual exceeds a defined threshold value by a defined margin.

10. The method of claim 9 further comprising assigning weights to anomalies based on a significance of respective residuals for a weighted calculation.

11. A system of finding a root cause of an anomaly in a network environment, comprising:
    a graph generator representing assets in the network environment as respective nodes in a causal graph, wherein the nodes have a measurable quality that can be tracked and arcs between pairs of nodes represent causal relationships between nodes of the node pairs, wherein source nodes are designated as processes at the top of a hierarchy of tracked processes, and sink nodes are designated as processes at the bottom of the hierarchy and having characteristics of interest in the environment;
    a detector detecting anomalies in the tracked processes embodied in the sink nodes; and
    a root cause analyzer traversing the causal graph in a reverse order from a node in which an outlier is detected, and analyzing nodes along the traversal path to identify a node of the highest hierarchy that shows unusual behavior as the root cause in a prioritized list of possible root causes.

12. The system of claim 11 further comprising a time series defined to track changes of the tracked processes across time in a defined time scale, and a graphical user interface displaying all anomalies detected in the environment against the time series scale.

13. The system of claim 12 wherein the time series comprises log data generated for data transactions of the nodes, and wherein the log data is transformed into time-series data using aggregations.

14. The system of claim 12 wherein the detector finds anomalies in the time series using one of a smoother process or a forecasting process using different forecasting models, and wherein the outlier comprises a detection on an edge of the time series.

15. The system of claim 14 wherein the detector compares results between forecasting models of the different forecasting models based on a test data set; selects a model with a minimal error as a best forecasting model; uses the best forecasting model to determine a difference between a predicted outlier value and an actual outlier value to determine a residual value; and declares the outlier to be an anomaly if the residual exceeds a defined threshold value by a defined margin.

16. The system of claim 15 wherein the detector further assigns weights to anomalies based on a significance of respective residuals for a weighted calculation.

17. The system of claim 11 wherein the network environment comprises a data protection network having a backup server and data storage devices storing data backed up from data sources by the backup server.

18. The system of claim 17 wherein the anomalies comprise significant changes in data backup performance through the backup server.

19. A computer program product, comprising a non-transitory computer-readable medium having a computer-readable program code embodied therein, the computer-readable program code adapted to be executed by one or more processors to perform a method of finding a root cause of an anomaly in a network environment, the method comprising:

representing assets in the network environment as respective nodes in a causal graph, wherein the nodes have a measurable quality that can be tracked and arcs between pairs of nodes represent causal relationships between nodes of the node pairs;

designating source nodes as processes at the top of a hierarchy of tracked processes, and sink nodes as processes at the bottom of the hierarchy and having characteristics of interest in the environment;

detecting anomalies in the tracked processes embodied in the sink nodes;

traversing the causal graph in a reverse order from a node in which an outlier is detected; and analyzing nodes along the traversal path to identify a node of the highest hierarchy that shows unusual behavior as the root cause in a prioritized list of possible root causes.

* * * * *